United States Patent [19]

Morgan et al.

[11] Patent Number: 5,162,826
[45] Date of Patent: Nov. 10, 1992

[54] HIGH INDEX OPHTHALMIC GLASSES

[75] Inventors: David W. Morgan, Corning, N.Y.; Michel Prassas, Vulaines, France

[73] Assignee: Corning Incorporated, Corning, N.Y.

[21] Appl. No.: 716,223

[22] Filed: Jun. 17, 1991

[51] Int. Cl.$^5$ .................... C03C 3/108; C03C 3/072; G02B 3/10

[52] U.S. Cl. ..................... 351/164; 501/13; 501/61; 501/75; 501/901; 501/903; 351/168; 351/172

[58] Field of Search ............ 501/61, 75, 901, 903; 351/168, 172, 164

[56] References Cited

U.S. PATENT DOCUMENTS

| | | | |
|---|---|---|---|
| 3,973,976 | 8/1976 | Boyd | 501/75 |
| 4,211,569 | 7/1980 | Hares et al. | 501/75 |
| 4,721,690 | 1/1988 | Ross et al. | 501/901 |

*Primary Examiner*—Mark L. Bell
*Attorney, Agent, or Firm*—C. S. Janes, Jr.

[57] ABSTRACT

This invention relates to the production of glasses exhibiting a refractive index between about 1.66–1.81, a softening point between about 625°–675° C., a strain point between about 455°–490° C., a linear coefficeint of thermal expansion (25°–300° C.) between about $53-65 \times 10^{-7}/°C.$, and good chemical durability which consist essentially, in weight percent, of:

| | | | | | |
|---|---|---|---|---|---|
| $SiO_2$ | 24–42 | $Li_2O$ | 0.2 | $Li_2O + Na_2O + K_2O$ | 0–3.5 |
| $Al_2O_3$ | 3–7.5 | $Na_2O$ | 0–2 | $ZrO_2$ | 0–2.5 |
| $B_2O_3$ | 2–7.5 | $K_2O$ | 0–3 | $TiO_2$ | 0–8 |
| PbO | 35–57 | $La_2O_3$ | 0–8 | $La_2O_3 + ZrO_2 + TiO_2$ | 4–12 |

2 Claims, No Drawings

HIGH INDEX OPHTHALMIC GLASSES

BACKGROUND OF THE INVENTION

This invention is directed to the production of glasses having high indices of refraction, i.e., glasses exhibiting indices of refraction higher than 1.6, preferably higher than 1.65. More particularly, this invention is directed to the production of glasses designed for use as segments (buttons) for high index multifocal photochromic lenses.

Multifocal photochromic ophthalmic products were initially marketed by Corning Glass Works, Corning, New York (now Corning Incorporated) in about the middle of 1970s. Compositions were developed for high refractive index segments which could be sealed to major lens portions (crowns) prepared from photochromic glasses marketed by Corning under the trademark PHOTOGRAY with the designations 20 8097 and 8098. Those glass compositions were included in U.S. Pat. No. 3,973,976 (Boyd) and were designed to exhibit refractive indices between 1.58–1.71, softening points between 630°–675° C., strain points between 450°–500° C., good chemical durability, and linear coefficients of thermal expansion (25°–100° C.) between $45$–$60 \times 10^{-7}$/°C. Those glasses consisted essentially, in weight percent, of 3–7% $B_2O_3$, 3–11% $Al_2O_3$, 30–60% PbO, and 27–55% $SiO_2$.

In the early 1980s Corning began to market extensively a different photochromic glass under the trademark PHOTOGRAY EXTRA with the designation 8111. Because the physical properties of this glass were dissimilar from those demonstrated by the earlier glasses, a different segment glass was required which displayed physical properties more closely compatible with those of the new photochromic glass than those demonstrated by the glasses of U.S. Pat. No. 3,973,976. The ensuing research led to the development of glass compositions included within U.S. Pat. No. 4,211,569 (Hares et. al.). Those glasses were designed to exhibit refractive indices between 1.58–1.71, softening points between 620°–645° C., strain points between 445°–480° C., linear coefficients of thermal expansion between $60$–$66 \times 10^{-7}$/°C., and excellent chemical durability. Those glasses consisted essentially, in weight percent, of 0–2% $Li_2O$, 0–3% $Na_2O$, 1–4% $Li_2O+Na_2O$, 4–9% BaO, 25–50% PbO, 4–8% $B_2O_3$, 30–50% $SiO_2$, 0—3% $La_2O_3$, 0–2% $ZrO_2$, and 0.5–4% $TiO_2$.

The photochromic glasses used for the major portions in multifocal products have had a refractive index of 1.523. It had been recognized that a photochromic glass exhibiting a higher refractive index would offer cosmetic improvement to eyeglasses, especially those having high minus prescriptions. The primary advantage resulting from the use of glasses demonstrating higher refractive indices resides in the fact that the required edge thickness is less. To attain comparable power for close vision, i.e., reading distance, higher refractive index segment glasses are needed for use with crown glasses having a refractive index of 1.6. As can be appreciated, the higher segment glasses must also exhibit all of the other chemical and physical characteristics demanded in conventional segment glasses; e.g., good chemical durability, coefficients of thermal expansion compatible with the crown glass, liquidus/viscosity relationships conducive for good melting and forming capabilities, low temperature viscosity values permitting good sealing to the major portion glass, etc.

To fill the requirements of multifocal ophthalmic products over the total spectrum of eyeglass prescriptions, several glasses that cover a range of refractive indices are needed. The refractive indices of button glasses that have been used to fill prescriptions with 1.523 crown glasses are recited below and are compared with those required for use with major portion glasses demonstrating a refractive index of 1.6.

| 1.523 Crown | 1.6 Crown (A) | 1.6 Crown (B) |
|---|---|---|
| 1.5880 | 1.6750 | 1.6670 |
| 1.6173 | 1.7085 | 1.6950 |
| 1 6533 | 1.7500 | 1.7330 |
| 1.7013 | 1,8051 | 1,7895 |

The 1.6 crown glasses designated (A) reflect refractive index lenses which are finished utilizing tools currently standard in the industry. The 1.6 crown glasses designated (B) reflect refractive index lenses which are more pleasing cosmetically, but which require different tools for finishing. In light of that situation, it will be necessary to be able to supply lenses from each of the eight categories to satisfy both groups of customers.

Photochromic glass lenses exhibiting a refractive index of 1.6 have been marketed by Corning under the designations 8171 and 8173. The composition of those lenses is included in U.S. application Ser. No. 07/581,789, filed Sept. 13, 1990 by Luc Grateau et. al. under the title FAST FADING, HIGH REFRACTIVE INDEX GLASS, now U.S. Pat. No. 5,023,209. That glass has a softening point of about 687° C., a strain point of about 495° C., and a linear coefficient of thermal expansion (25°–300° C.) of about $60 \times 10^{-7}$/°C.

As can be observed, the segment glasses described in U.S. Pat. No. 3,973,976 and in U.S. Pat. No. 4,211,569 could be considered for use with 8171 and 8173 glasses at refractive indices up to 1.71. The objective of the present invention, however, was to devise a family of base glasses, the members of which exhibit properties rendering them suitable for sealing to 8171 and 8173 glasses, and which can exhibit refractive indices as high as about 1.81. Stated in another way, the goal of our research was to develop a range of glass compositions wherein, by varying the concentrations of the individual components, glasses could be produced displaying refractive indices across the whole spectrum of about 1.66–1.81. The efficiencies in commercial production attendant in utilizing glass compositions within a single family are self-evident.

SUMMARY OF THE INVENTION

That objective can be achieved in glass compositions exhibiting good chemical durability consisting essentially, expressed in terms of weight percent on the oxide basis, of:

| | | | | | |
|---|---|---|---|---|---|
| $SiO_2$ | 24–42 | $Li_2O$ | 0–2 | $La_2O_3$ | 0–8 |
| $Al_2O_3$ | 3–7.5 | $Na_2O$ | 0–2 | $ZrO_2$ | 0–2.5 |
| $B_2O_3$ | 2–7.5 | $K_2O$ | 0–3 | $TiO_2$ | 0–8 |
| PbO | 35–57 | $Li_2O +$ $Na_2O + K_2O$ | 0–3.5 | $La_2O_3 +$ $ZrO_2 + TiO_2$ | 4–12 |

Those glasses exhibit softening points between about 625°–675° C., strain points between about 455°–490° C., and linear coefficients of thermal expansion (25°–300°

C.) between about 53–65×10$^{-7}$/°C., thereby rendering them quite compatible with the photochromic glasses of U.S. Ser. No. 07/581,789 exhibiting refractive indices in the vicinity of 1.6 and, hence, assuring the development of sound seals between an inventive glass segment and the photochromic crown glass.

As has been implied above, the operable limit of any particular component is dependent in some degree upon the concentrations of the remaining components. For example, to maintain the desired viscosity and thermal expansion values at high levels of PbO, the amount of $Li_2O + Na_2O + K_2O$ will be low, if present at all. In contrast, the content of $TiO_2$ will generally track that of PbO; i.e., higher concentrations of $TiO_2$ will accompany higher levels of PbO. The level of $TiO_2$ should be limited to about 8%, however, because of its adverse effect upon the dispersion of the glass. $La_2O_3$ can play several important roles in the inventive glass compositions. For example, it can steepen the viscosity curve of the glass, enhance the chemical durability thereof, and raise the refractive index with less dispersion than PbO. It also enables the concentrations of $B_2O_3$ to be increased, thereby leading to an overall softening of the glass at the temperature where the glass in the form of a segment is sealed to a major photochromic lens portion, while maintaining an adequately high strain point and a sufficiently low coefficient of thermal expansion to obtain a low stress level in the seal. Therefore, the preferred glass compositions will contain at least 1% $La_2O_3$. $Al_2O_3$ and $B_2O_3$ advantageously interact with one another. To illustrate, at least 3% $Al_2O_3$ imparts good chemical durability to the glass, but its presence may harden the glass at fusing temperatures. That effect can be balanced through the inclusion of $B_2O_3$ to yield acceptable viscosity values in the sealing temperature range.

Minor additions of the alkaline earth metal oxides can be useful in varying the melting and forming characteristics of the glass along with such properties thereof as thermal expansion, chemical durability, refractive index, etc. BaO is particularly desirable in that it can raise the refractive index of the glass and beneficially increase the dispersion thereof. Nevertheless, BaO hardens the glass so about 10% has been deemed to constitute a practical maximum value. Individually and collectively, the amounts of the other alkaline earth metal oxides will not exceed about 5%, with the total alkaline earth metal content not exceeding about 10%.

The inclusion of $Nb_2O_5$ in amounts up to about 10% can be useful in raising the refractive index of the glass without seriously affecting the dispersion thereof.

PRIOR ART

Other patents disclosing glasses demonstrating high refractive indices, but wherein the compositions therefor are less relevant than U.S. Pat. No. 3,973,976 and U.S. Pat. No. 4,211,569, which were discussed above, are briefly reviewed below.

U.S. Pat. No. 3,915,723 (Upton) describes glasses stated to be useful as segments with Corning photochromic crown glasses 8097 and 8098. The glasses are asserted to exhibit indices of refraction ranging between 1.59–1.70 and consisted essentially, in weight percent of:

| $SiO_2$ | 16–36 | BaO | 1.9–2.5 | $K_2O$ | 0–2 |
|---|---|---|---|---|---|
| $B_2O_3$ | 14–33 | $As_2O_3$ | 0.25–0.35 | $Na_2O$ | 0–1 |

-continued

| $Al_2O_3$ | 8.5–10.5 | PbO | 27–36 | $TiO_2$ | 0–5 |
|---|---|---|---|---|---|
| ZnO | 4.2–5.4 | $Sb_2O_3$ | 1.4–2.0 | $La_2O_3$ | 0–6 |

As is immediately evident, distinct differences exist between those composition intervals and those of the inventive glasses, most particularly with respect to $Al_2O_3$, $B_2O_3$, and PbO.

U.S. Pat. No. 3,999,996 (Faulstich et. al.) is directed to segment glasses suitable for sealing to photochromic major portions, the segment glasses demonstrating linear coefficients of thermal expansion between 45–58×10$^{-7}$/°C., refractive indices between about 1.6–1.66, and consisting, by weight percent, of:

| $SiO_2$ | 10–20 | $La_2O_3$ | 6–10 | $K_2O$ | 0.1–2 |
|---|---|---|---|---|---|
| $B_2O_3$ | 15–23 | $Al_2O_3$ | 12–17 | $Na_2O$ | 0.1–2 |
| PbO | >26–30 | $ZrO_2$ | 0.5–3 | $Li_2O$ | 0.1–4 |
| ZnO | 3–5 | $TiO_2$ | 0.2–3 | | |

Again, wide variations in composition can immediately be discerned existing between those glasses and those of the present invention in the concentrations of $Al_2O_3$, $B_2O_3$, $La_2O_3$, and PbO.

U.S. Pat. No. 4,149,896 (Faulstich et. al.) presents phototropic glasses exhibiting indices of refraction over 1.6 (the highest refractive index displayed in the working examples was 1.6596) and linear coefficients of thermal expansion between about 43–58×10$^{-7}$/°C. Exclusive of the Ag, CuO, and halides to impart phototropic behavior to the glasses, the base compositions therefor consisted, in weight percent, of:

| $SiO_2$ | 5–30 | $La_2O_3$ | 12–30 | $K_2O$ | 0–2 |
|---|---|---|---|---|---|
| $B_2O_3$ | 7–35 | $Al_2O_3$ | 12–25 | $Na_2O$ | 0–2 |
| PbO | 6–26 | $ZrO_2$ | 0–6 | $Li_2O$ | 0–4 |
| ZnO | 0–15 | $TiO_2$ | 0–3 | | |

Yet again, the individual components of those glasses vary widely in concentrations from those of the instant inventive glasses.

U.S. Pat. No. 4,351,906 (Boudot et. al.) is drawn to glasses operable as segments for multifocal ophthalmic lenses, the glasses demonstrating refractive indices between about 1.745–1.771 and linear coefficients of thermal expansion between about 90–98×10$^{-7}$/°C. The glasses consist essentially, in weight percent, of:

| $SiO_2$ | 28–32.5 | PbO | 28.5–34 |
|---|---|---|---|
| $Li_2O$ | 0–1 | ZnO | 0–4 |
| $Na_2O$ | 2–9 | $ZrO_2$ | 2–6.5 |
| $K_2O$ | 0–4 | $TiO_2$ | 0–9 |
| $Li_2O + Na_2O + K_2O$ | 4–10.5 | $Nb_2O_5$ | 0–10 |
| BaO | 0–22 | $TiO_2 + Nb_2O_5$ | 4.5–12 |
| $La_2O_3$ | 0–20 | $ZrO_2 + TiO_2 + Nb_2O_5$ | 6–17 |
| $BaO + La_2O_3$ | 14–22 | | |

Not only are the compositions of the patented glasses outside of those of the present invention, but also the coefficients of thermal expansion are much too high to permit the production of sound seals with the photochromic glasses to which the inventive segments are to be sealed.

U.S Pat. No. 4,507,393 (Kassner et. al.) discloses glasses designed as segments for multifocal ophthalmic lenses demonstrating refractive indices between about 1.730–1.750 and linear coefficients of thermal expansion between about 77–83×10$^{-7}$/°C. The glasses consisted essentially, in weight percent, of:

| SiO$_2$ | 23–32 | PbO | 15–30 |
|---|---|---|---|
| B$_2$O$_3$ | 4–7 | TiO$_2$ | 0.5–10 |
| Al$_2$O$_3$ | 0.5–3 | La$_2$O$_3$ | 5–20 |
| BaO | 23–30 | Nb$_2$O$_5$ | 0–1 |

As can be seen, the ranges of several of the components are outside the composition intervals of the present inventive glasses.

U.S Pat. No. 4,562,162 (Sagara) is concerned with segment glasses for multifocal ophthalmic lenses, the glasses displaying refractive indices between 1.67–1.73 and linear coefficients of thermal expansion between 82–95×10$^{-7}$/°C. The glasses consist essentially, in weight percent, of:

| SiO$_2$ | 22–40 | PbO | 30–47 |
|---|---|---|---|
| Al$_2$O$_3$ | 0–4 | BaO | 0–20 |
| B$_2$O$_3$ | 0–10 | SrO | 0–15 |
| Al$_2$O$_3$ + B$_2$O$_3$ + SiO$_2$ | 32–40 | CaO | 0–10 |
| Li$_2$O | 0–4 | MgO | 0–8 |
| Na$_2$O | 0–7 | ZnO | 0–15 |
| K$_2$O | 0–7 | BaO + SrO + CaO + MgO + ZnO | 3–24 |
| Li$_2$O + Na$_2$O + K$_2$O | 4–10 | ZrO$_2$ | 1–7 |

The coefficients of thermal expansion are too high to be compatible with the photochromic glasses to which they are to be sealed. Furthermore, La$_2$O$_3$ is nowhere referred to in the patent.

U.S. Pat. No. 4,568,651 (Sagara) is directed to segment glasses for multifocal ophthalmic lenses, the glasses exhibiting refractive indices between 1.74–1.78 and linear coefficients of thermal expansion between 2–95×10$^{-7}$/°C. The glasses consist essentially, in weight percent, of:

| SiO$_2$ | 14–24 | SrO | 0–17 |
|---|---|---|---|
| Al$_2$O$_3$ | 0–4 | CaO | 0–15 |
| B$_2$O$_3$ | 6–14 | MgO | 0–10 |
| Al$_2$O$_3$ + B$_2$O$_3$ + SiO$_2$ | 26–34 | ZnO | 0–12 |
| PbO | 38–50 | BaO + SrO + CaO + MgO + ZnO | 15–30 |
| BaO | 2–24 | ZrO$_2$ | 0–3 |

Not only are the coefficients of thermal expansion of those glasses incompatible with the photochromic glasses to which they are intended to be sealed into, but also La$_2$O$_3$ is not mentioned by the patentee.

U S. Pat. No. 4,824,809 (Grabowski et. al.) is drawn to glasses manifesting refractive indices between 1.73–1.78 consisting essentially, in weight percent, of:

| SiO$_2$ | 12–20 | ZrO$_2$ | 0.5–3 |
|---|---|---|---|
| B$_2$O$_3$ | 10–18 | La$_2$O$_3$ | 2–10 |
| PbO | 50–60 | Cs$_2$O | 0–5 |
| Al$_2$O$_3$ | 2–7 | TiO$_2$ | 0–5 |
| ZnO | 0–4 | Na$_2$O + K$_2$O + Li$_2$O | 0–1 |

The ranges of SiO$_2$ and B$_2$O$_3$ are outside the composition intervals of the present inventive glasses.

As can be seen from the above reviews, no glasses are described having compositions even closely approximating those of the instant inventive glasses. Moreover, none of the patents refers to a family of glass compositions which can be so varied as to yield indices of refraction ranging from 1.66–1.81, while maintaining other chemical and physical properties required in glasses to be used as segments in multifocal lenses.

DESCRIPTION OF PREFERRED EMBODIMENTS

Table I lists a group of glasses, expressed in terms of parts by weight on the oxide basis, illustrating the compositional parameters of the present invention. Table IA records the same group of glass compositions expressed in terms of cation percent on the oxide basis. Inasmuch as the sum of the individual components in Table I closely approximates 100, for all practical purposes the values reported there can be deemed to represent weight percent. The actual batch ingredients may comprise any materials, either an oxide or other compound, which, when melted together with the remainder of the batch components, will be converted into the desired oxide in the proper proportions. For example, Li$_2$CO$_3$ and NaNO$_3$ can comprise the source of Li$_2$O and Na$_2$O, respectively.

The batch ingredients were compounded, tumble mixed together to assist in securing a homogeneous melt, and charged into platinum crucibles. After placing lids on the crucibles, the crucibles were moved into a furnace operating at a temperature of 1400° C. and held therewithin for a sufficient length of time to assure homogeneous melts (customarily about 4 hours) with occasional stirring. The lids were removed and the melts poured into steel molds to yield glass slabs having dimensions of about 6"×6"×0.5" which were transferred immediately to an annealer operating at about 520°. Arsenic was incorporated into the glass batch to perform its conventional function as a fining agent. In general, where included, the amount thereof will not exceed 0.5% by weight expressed as As$_2$O$_3$.

Whereas the above description reflects work performed in the laboratory, it will be recognized that the inventive glasses are capable of being melted in large scale melting units and shaped into articles of desired configurations employing techniques conventional in the glass art. That is, in accordance with standard glass melting and forming practice, it is only necessary that the batch materials be mixed together thoroughly, that batch melted at temperatures and for times sufficient to produce a homogeneous melt, that melt cooled and simultaneously shaped into a glass article of a desired geometry, and that glass article normally annealed.

TABLE I

| | 1 | 2 | 3 | 4 | 5 | 6 | 7 | 8 | 9 |
|---|---|---|---|---|---|---|---|---|---|
| SiO$_2$ | 28.8 | 31.6 | 36.7 | 40.5 | 36.7 | 28.8 | 25.3 | 35.8 | 38.5 |
| B$_2$O$_3$ | 4.59 | 4.6 | 4.6 | 4.6 | 2.6 | 4.59 | 3.29 | 3.67 | 2.6 |
| Al$_2$O$_3$ | 4.22 | 4.22 | 4.22 | 4.22 | 6.23 | 4.22 | 3.96 | 5.15 | 6.22 |
| Li$_2$O | 0.177 | 0.43 | 0.881 | 1.21 | 0.88 | 0.177 | 0.166 | 0.793 | 1.04 |
| Na$_2$O | — | 0.298 | 0.832 | 1.21 | 0.831 | — | — | 0.731 | 1.02 |
| La$_2$O$_3$ | 3.06 | 3.15 | 3.15 | 3.14 | 3.16 | 3.06 | 2.87 | 3.16 | 3.16 |

TABLE I-continued

|      | 1     | 2     | 3     | 4     | 5     | 6     | 7     | 8     | 9     |
|------|-------|-------|-------|-------|-------|-------|-------|-------|-------|
| PbO  | 52.3  | 49.2  | 43.7  | 39.6  | 43.7  | 52.3  | 55.7  | 44.7  | 41.8  |
| $TiO_2$ | 5.27 | 4.94 | 4.35 | 3.91 | 4.35 | 5.27 | 7.29 | 4.46 | 4.13 |
| $ZrO_2$ | 1.24 | 1.32 | 1.32 | 1.31 | 1.32 | 1.24 | 1.17 | 1.32 | 1.32 |
| $As_2O_3$ | 0.277 | 0.216 | 0.213 | 0.213 | 0.209 | 0.277 | 0.26 | 0.231 | 0.21 |

TABLE IA

|      | 1     | 2     | 3     | 4     | 5     | 6     | 7     | 8     | 9     |
|------|-------|-------|-------|-------|-------|-------|-------|-------|-------|
| $SiO_2$   | 46.2 | 48.1 | 51.1 | 53.2 | 51.9 | 46.2 | 43.2 | 51.0 | 53.0 |
| $B_2O_3$  | 12.7 | 12.1 | 11.1 | 10.4 | 6.36 | 12.7 | 9.71 | 9.03 | 6.16 |
| $Al_2O_3$ | 7.97 | 7.56 | 6.94 | 6.53 | 10.4 | 7.97 | 7.97 | 8.66 | 10.1 |
| $Li_2O$   | 1.14 | 2.63 | 4.94 | 6.38 | 5.01 | 1.14 | 1.14 | 4.55 | 5.75 |
| $Na_2O$   | —    | 0.88 | 2.25 | 3.1  | 2.28 | —    | —    | 2.02 | 2.71 |
| $La_2O_3$ | 1.81 | 1.77 | 1.62 | 1.52 | 1.65 | 1.81 | 1.81 | 1.66 | 1.6  |
| PbO       | 22.6 | 20.1 | 16.4 | 14.0 | 16.7 | 22.6 | 25.6 | 17.1 | 15.4 |
| $TiO_2$   | 6.36 | 5.65 | 4.56 | 3.86 | 4.63 | 6.36 | 9.36 | 4.78 | 4.27 |
| $ZrO_2$   | 0.97 | 0.98 | 0.9  | 0.84 | 0.91 | 0.97 | 0.97 | 0.92 | 0.885|
| $As_2O_3$ | 0.27 | 0.2  | 0.18 | 0.17 | 0.18 | 0.27 | 0.27 | 0.2  | 0.175|

Table II records values of refractive index ($n_d$), density ($\rho$), Abbe number ($\nu_d$), softening point (S.P.) expressed in °C., annealing point (A.P.) expressed in °C., strain point (St.P.) expressed in °C., and linear coefficients of thermal expansion over the temperature range 25°–300° C. (Exp) expressed in terms of $\times 10^{-7}$/°C. determined in accordance with measuring techniques conventional in the glass art. Table II also reports the results obtained when the glasses were subjected to the American Optical (A.O.) test. This test comprises measuring the change in weight, expressed in terms of mg/cm², experienced by a glass sample after being submerged in an aqueous 10% by weight HCl solution for 10 minutes at 25° C. The test method is described in detail in *Applied Optics*, 7, No. 5, page 847, May 1968.

TABLE II

|       | 1      | 2      | 3      | 4      | 5      | 6      | 7      | 8      | 9      |
|-------|--------|--------|--------|--------|--------|--------|--------|--------|--------|
| $n_d$ | 1.7544 | 1.7358 | 1.6914 | 1.6640 | 1.6933 | 1.7486 | >1.8   | 1.6944 | 1.6751 |
| $\rho$| 4.287  | 4.090  | 3.797  | 3.599  | 3.816  | 4.294  | 4.583  | 3.867  | 3.729  |
| $\nu_d$| 27.8  | 29.1   | 31.8   | 34.1   | 31.8   | 28.1   | <28    | 31.3   | 32.7   |
| S.P.  | 632    | 632    | 630    | 630    | 660    | 631    | 628    | 644    | 661    |
| A.P.  | 506    | 502    | 492    | 490    | 523    | 509    | 502    | 501    | 511    |
| St.P. | 473    | 471    | 461    | 458    | 468    | 470    | 470    | 467    | 473    |
| Exp   | 57.8   | 58     | 57.9   | 57.7   | 58     | 57.5   | 62.8   | 57.6   | 57.8   |
| A.O.  | −0.01  | —      | —      | —      | —      | —      | +0.004 | —      | —      |

The good chemical durability exhibited by the inventive glass is evidenced by the very low change in weight experienced in the A.O. test. The change will not exceed 0.03 mg/cm².

I claim:

1. A glass exhibiting a refractive index between about 1.66–1.81, a softening point between about 625°–675° C., a strain point between about 455°–490° C., a linear coefficient of thermal expansion (25°–300° C.) between about $53-65\times10^{-7}$/°C., and good chemical durability as evidenced by a weight change in the A.O. test not exceeding 0.03 mg/cm², said glass consisting essentially, expressed in terms of weight percent on the oxide basis, of:

| $SiO_2$   | 24–42 | $Li_2O$ | 0–2   | $La_2O_3$ | 1–8   |
|-----------|-------|---------|-------|-----------|-------|
| $Al_2O_3$ | 3–7.5 | $Na_2O$ | 0–2   | $ZrO_2$   | 0–2.5 |
| $B_2O_3$  | 2–7.5 | $K_2O$  | 0–3   | $TiO_2$   | 0–8   |
| PbO       | 35–57 | $Li_2O + Na_2O + K_2O$ | 0–3.5 | $La_2O_3 + ZrO_2 + TiO_2$ | 4–12. |

2. An ophthalmic multifocal lens consisting of a major lens portion and a high refractive index segment sealed to said major lens portion, said major lens portion being prepared from a photochromic glass exhibiting a refractive index of about 1.6, a softening point of about 687° C., a strain point of about 495° C., and a linear coefficient of thermal expansion (25°–300° C.) of about $50\times10^{-7}$/°C., and said segment being prepared from a glass exhibiting a refractive index between about 1.66–1.81, a softening point between about 626°–675° C., a strain point between about 455°–490° C., a linear coefficient of thermal expansion (25°–300° C.) of about $53-65\times10^{-7}$/°C., and good chemical durability as evidenced by a weight change in the A.O. test not exceeding 0.03 mg/cm², said glass consisting essentially, expressed in terms of weight percent on the oxide basis, of:

| $SiO_2$   | 24–42 | $Li_2O$ | 0–2   | $La_2O_3$ | 1–8   |
|-----------|-------|---------|-------|-----------|-------|
| $Al_2O_3$ | 3–7.5 | $Na_2O$ | 0–2   | $ZrO_2$   | 0–2.5 |
| $B_2O_3$  | 2–7.5 | $K_2O$  | 0–3   | $TiO_2$   | 0–8   |
| PbO       | 35–57 | $Li_2O + Na_2O + K_2O$ | 0–3.5 | $La_2O_3 + ZrO_2 + TiO_2$ | 4–12. |

* * * * *